(12) United States Patent
Pagliuso et al.

(10) Patent No.: US 12,440,116 B2
(45) Date of Patent: Oct. 14, 2025

(54) CIRCUMFERENTIALLY SENSING MANOMETRY SYSTEMS AND METHODS WITH CATHETER UTILIZING PRESSURE SENSITIVE MEMS

(71) Applicant: Covidien LP, Mansfield, MA (US)

(72) Inventors: Benjamin J. Pagliuso, Marina Del Rey, CA (US); Ali S. Ghaderi, Hawthorne, CA (US); Salim M. Motiwala, Agoura Hills, CA (US); Sergiy P. Kanilo, Santa Clara, CA (US); Jeffrey T. Sawyer, Lakewood, CO (US); Robert G. Carruthers, Columbia, TN (US); Mark A. Maguire, Hillsborough, CA (US); Monika P. Marciniak, Inglewood, CA (US); Sebastian E. Arevalo, Gilbert, AZ (US)

(73) Assignee: Covidien LP, Mansfield, MA (US)

( * ) Notice: Subject to any disclaimer, the term of this patent is extended or adjusted under 35 U.S.C. 154(b) by 370 days.

(21) Appl. No.: 18/028,825

(22) PCT Filed: Oct. 18, 2021

(86) PCT No.: PCT/US2021/055367
§ 371 (c)(1),
(2) Date: Mar. 28, 2023

(87) PCT Pub. No.: WO2022/086838
PCT Pub. Date: Apr. 28, 2022

(65) Prior Publication Data
US 2023/0363660 A1    Nov. 16, 2023

Related U.S. Application Data

(60) Provisional application No. 63/093,392, filed on Oct. 19, 2020.

(51) Int. Cl.
*A61B 5/03* (2006.01)
*A61B 5/0538* (2021.01)

(52) U.S. Cl.
CPC ............ *A61B 5/037* (2013.01); *A61B 5/0538* (2013.01); *A61B 2562/0247* (2013.01);
(Continued)

(58) Field of Classification Search
CPC .................. A61B 5/037; A61B 5/0538; A61B 2562/0247; A61B 2562/028;
(Continued)

(56) References Cited

U.S. PATENT DOCUMENTS

| | | | |
|---|---|---|---|
| 2005/0148884 A1* | 7/2005 | Parks | A61B 5/037 600/488 |
| 2006/0195014 A1* | 8/2006 | Seibel | A61B 1/0008 600/102 |
| 2019/0282109 A1 | 9/2019 | Schlumpf et al. | |

OTHER PUBLICATIONS

International Search Report and Written Opinion of the International Searching Authority issued in corresponding application PCT/US2021/055367 mailed Feb. 2, 2022 (10 pages).

(Continued)

*Primary Examiner* — Benjamin J Klein
*Assistant Examiner* — Alisha J Sircar
(74) *Attorney, Agent, or Firm* — Carter, DeLuca & Farrell LLP

(57) ABSTRACT

A manometric catheter probe includes a flexible printed circuit, one or more pressure sensor assemblies coupled to the flexible printed circuit along a length of the flexible printed circuit, and a first flexible sleeve. Each pressure sensor assembly includes a body. The body includes a central cavity configured to receive the flexible printed circuit and an annular recess of the body. Each pressure sensor assembly further includes a microelectromechanical systems (MEMS) sensor disposed in the annular recess, an (Continued)

electrical connector configured to electrically couple the MEMS sensor and the flexible printed circuit, and a first flexible sleeve disposed over the annular recess of the body. The first flexible sleeve includes a fluid configured to communicate pressure to the MEMS sensor, and a second sleeve is disposed over the pressure sensor assembly.

21 Claims, 12 Drawing Sheets

(52) U.S. Cl.
CPC ... *A61B 2562/028* (2013.01); *A61B 2562/166* (2013.01); *A61B 2562/227* (2013.01)

(58) Field of Classification Search
CPC ........ A61B 2562/166; A61B 2562/227; A61B 2562/164; A61B 5/4205; A61B 5/4233; A61B 5/6852
See application file for complete search history.

(56) References Cited

OTHER PUBLICATIONS

European Examination Report issued in corresponding application EP 21806555.5 dated Feb. 6, 2024 (6 pages).

\* cited by examiner

CIRCUMFERENTIALLY SENSING MANOMETRY SYSTEMS AND METHODS WITH CATHETER UTILIZING PRESSURE SENSITIVE MEMS

CROSS REFERENCE TO RELATED APPLICATIONS

This application is a U.S. National Stage Application filed under 35 U.S.C. § 371 (a) of International Patent Application No. PCT/US2021/055367, filed Oct. 18, 2021, which claims the benefit of the filing date of provisional U.S. Patent Application No. 63/093,392, filed Oct. 19, 2020.

FIELD

This disclosure relates generally to diagnostic instruments, and more particularly, to a system for circumferentially sensing manometry with a catheter utilizing pressure sensitive microelectromechanical systems (MEMS).

BACKGROUND

The esophagus is a tubular organ that carries food and liquid from the throat to the stomach. Accurate measurements of physiological parameters of the esophagus under realistic swallowing conditions are valuable in diagnosing esophageal diseases such as achalasia, dysphagia, diffuse esophageal spasm, ineffective esophageal motility, and hypertensive lower esophageal sphincter (LES). When a person with a healthy esophagus swallows, circular muscles in the esophagus contract. The contractions begin at the upper end of the esophagus and propagate downwardly toward the lower esophageal sphincter (LES). The function of the peristaltic muscle contractions, i.e., to propel food and drinks through the esophagus to the stomach, is sometimes called the motility function, but is also often referred to as peristalsis.

Esophageal manometry, in particular, is a test used to assess pressure and motor function of the esophagus, allowing physicians to evaluate how well the muscles in the esophagus work to transport liquids or food from the mouth into the stomach.

There is continuing interest in developing and improving systems and methods for assessing pressure and motor function of the esophagus.

SUMMARY

In accordance with the disclosure, a manometric catheter probe includes a flexible printed circuit, at least one pressure sensor assembly coupled with the flexible printed circuit along a length of the flexible printed circuit, and a second sleeve disposed over the at least one pressure sensor assembly. Each pressure sensor assembly includes a body. The body includes a central cavity configured to receive the flexible printed circuit and an annular recess in the body. Each pressure sensor assembly further includes a microelectromechanical systems (MEMS) sensor disposed in the annular recess, an electrical connector configured to electrically couple the MEMS sensor and the flexible printed circuit, and a first flexible sleeve disposed over the body in a manner forming a cavity between the first flexible sleeve and the annular recess for containing a fluid. The fluid is configured to communicate pressure to the MEMS sensor.

In an aspect, the body of the at least one pressure sensor assembly may include a cylindrical shape.

In another aspect, each pressure sensor assembly may further include a fluid injection port configured for filling the fluid in the first flexible sleeve.

In an aspect, the electrical connector may include a flexible circuit and/or a printed circuit board.

In yet another aspect, the annular recess may be a ring configuration and is disposed about a midportion of a perimeter of the body.

In still yet another aspect, each pressure sensor assembly may be configured to sense pressure from any angle around the manometric catheter probe at the respective location of each pressure sensor assembly along a length of the manometric catheter probe.

In still yet another aspect, the fluid may include oil.

In still yet another aspect, the central cavity may be configured for a movement of air and/or a movement of a second fluid.

In accordance with aspects of the disclosure, each pressure sensor assembly may further include a first sealing channel disposed on a first end of the body and configured to seal the fluid in the first flexible sleeve and a second sealing channel disposed on a second end of the body and configured to seal the fluid in the first flexible sleeve.

In an aspect, the instructions, each pressure sensor assembly may further include a spring contact configured to electrically couple the MEMS sensor and the flexible printed circuit.

In accordance with other aspects of the disclosure, a manometry system includes a manometric catheter probe, a processor, and a memory. The manometric catheter probe includes a flexible printed circuit and at least one pressure sensor assembly coupled with the flexible printed circuit along a length of the flexible printed circuit. Each pressure sensor assembly includes a body, a central cavity through the body receiving at least a portion of the flexible printed circuit, and a pressure balloon disposed on an outside of the central cavity. The pressure balloon includes a fluid configured to communicate pressure to a microelectromechanical systems (MEMS) sensor, and a first flexible sleeve disposed over the body in a manner forming a cavity between the first flexible sleeve and the annular recess for containing the fluid. The at least one pressure sensor assembly further includes a MEMS sensor disposed in the pressure balloon, in communication with the fluid, an electrical connector configured to electrically couple the MEMS sensor and the flexible printed circuit, and a second sleeve disposed over the at least one pressure sensor assembly. The memory includes instructions stored thereon, which, when executed by the processor, cause the manometry system to acquire a pressure measurement from the at least one pressure sensor assembly, and determine, based on the measurement(s), a motility function of an esophagus and/or a bolus transit dynamics in the esophagus.

In another aspect, the body of the at least one pressure sensor assembly may include a cylindrical shape.

In yet another aspect, the at least one pressure sensor assembly may further include a fluid injection port configured for filling the fluid in the first flexible sleeve.

In still yet another aspect, the electrical connector may include of a flexible circuit and/or a printed circuit board.

In still yet another aspect, the pressure balloon is disposed about a midportion of a perimeter of the body.

In still yet another aspect, the fluid may include oil.

In still yet another aspect, the central cavity may be configured for a movement of air and/or a movement of a second fluid.

In still yet another aspect, the system may further include a temperature sensor and/or an impedance sensor.

In still yet another aspect, the system may further include a wireless communication module.

In accordance with other aspects of the disclosure, a manometric catheter sensor assembly includes a body. The body includes a central cavity and an annular recess around a circumference of the body. The manometric catheter sensor assembly further includes: a microelectromechanical systems (MEMS) sensor disposed in the annular recess of the body; an electrical connector configured to electrically couple the MEMS sensor and a flexible printed circuit; a first flexible sleeve disposed over the body in a manner forming a cavity between the first flexible sleeve and the annular recess of the body for containing a fluid, the fluid configured to communicate pressure to the MEMS sensor; a first sealing channel disposed on a first end of the body and configured to seal the fluid in the first flexible sleeve; a second sealing channel disposed on a second end of the body and configured to seal the fluid in the first flexible sleeve; and an second sleeve disposed over the MEMS sensor.

In accordance with aspects of the disclosure, a manometric catheter probe kit includes a flexible printed circuit, at least one pressure sensor assembly, and a second sleeve configured to be disposed over the at least one pressure sensor assembly. The at least one pressure sensor assembly includes a body including a central cavity configured to receive at least a portion of the flexible printed circuit; an annular recess around the body; a microelectromechanical systems (MEMS) sensor configured to be disposed in the annular recess; an electrical connector configured to electrically couple the MEMS sensor and the flexible printed circuit; and a first flexible sleeve configured to be disposed over the body in a manner forming a cavity between the first flexible sleeve and the annular recess for containing a fluid, the first flexible sleeve including the fluid configured to communicate pressure to the MEMS sensor.

BRIEF DESCRIPTION OF DRAWINGS

Various aspects of the disclosure are described herein with reference to the drawings wherein.

DETAILED DESCRIPTION

Figure 1:
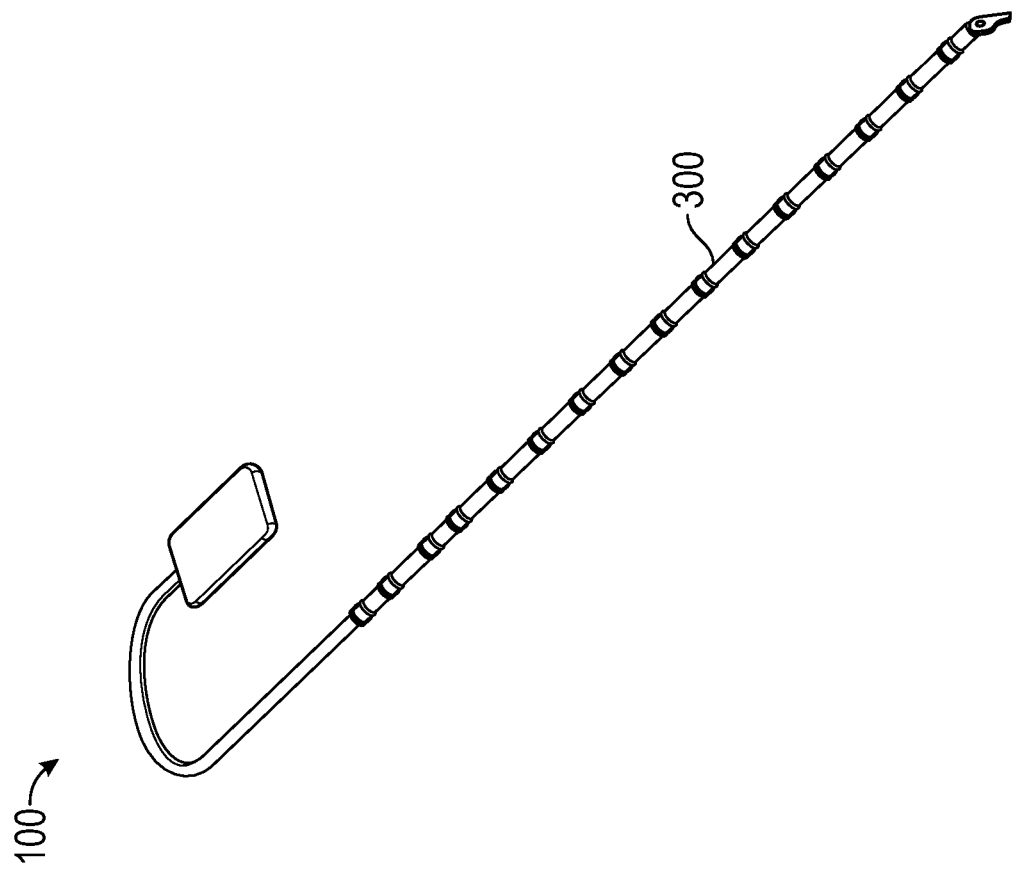
FIG. 1 is an illustration of a manometry system in accordance with the disclosure.
Figure 1:
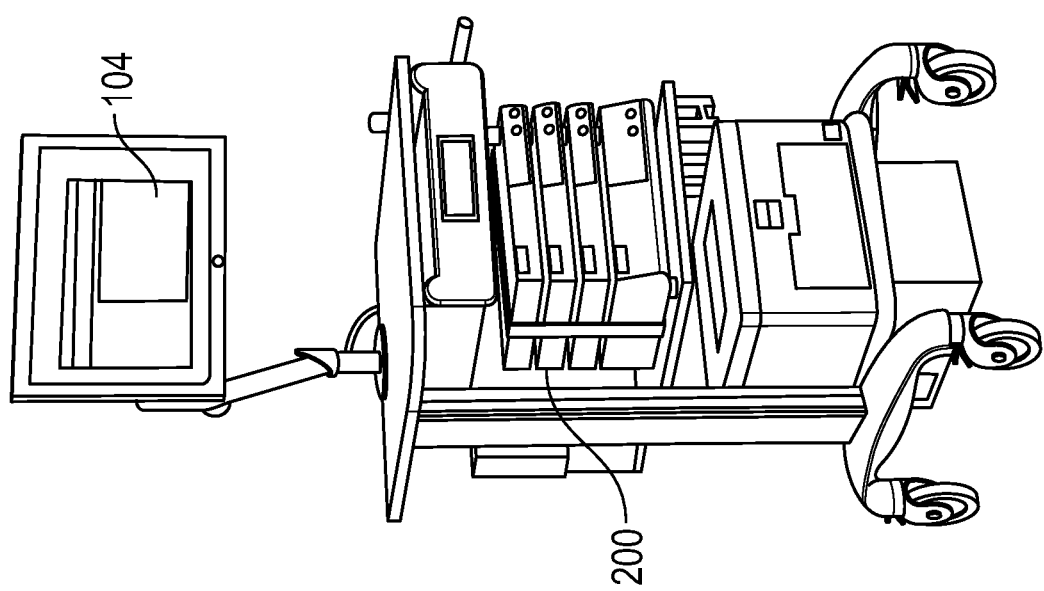

The disclosed surgical device will now be described in detail with reference to the drawings in which like reference numerals designate identical or corresponding elements in each of the several views. However, it is to be understood that the aspects of the disclosure are merely exemplary of the disclosure and may be embodied in various forms. Well-known functions or constructions are not described in detail to avoid obscuring the disclosure in unnecessary detail. Therefore, specific structural and functional details disclosed herein are not to be interpreted as limiting, but merely as a basis for the claims and as a representative basis for teaching one skilled in the art to variously employ the disclosure in virtually any appropriately detailed structure. In addition, directional terms such as front, rear, upper, lower, top, bottom, distal, proximal, and similar terms are used to assist in understanding the description and are not intended to limit the disclosure.

This disclosure relates generally to diagnostic instruments, and more particularly, to a manometry system for circumferentially sensing manometry with a catheter utilizing pressure-sensitive MEMS.

Esophageal manometry, in particular, is a test used to assess pressure and motor function of the esophagus, allowing physicians to evaluate how well the muscles in the esophagus work to transport liquids or food from the mouth into the stomach. To perform this test, the manometry system operates in conjunction with a manometric catheter probe placed in the esophagus of a patient to record pressure and/or impedance data over a period of time using various sensors placed on the catheter. The data is analyzed using analysis software to evaluate causes of, and help diagnose conditions such as gastric reflux, difficulty swallowing, functional chest pain, achalasia, and hiatal hernia.

The manometry system obtains high resolution and/or three-dimensional (3D) mapping of pressure levels within the tubular organs of the human gastrointestinal tract and, optionally, pressure with impedance levels within the tubular organs of the human upper gastrointestinal tract which may include the pharynx, esophagus, proximal gut (stomach/duodenum), anus, and rectum. The manometry system is used in a medical clinical setting to acquire the pressure and impedance levels and store the corresponding data for visualization and analysis using the software. Esophageal manometry is used as an example, the systems and methods of the disclosure are applicable to other forms of manometry systems, for example, a rectal manometry system.

FIG. 1 illustrates a manometry system 100. The manometry system 100 generally includes a controller 200, a display 104, and a manometric catheter probe 300. The controller 200 (FIG. 2) is configured to execute software for data acquisition and analysis. Various manometric catheter probe 300 configurations may be used depending on the application (esophageal/anorectal manometry), size, and catheter diameter.

The manometry system 100 enables full evaluation of the motor functions of an esophagus. The system allows for enhanced sensitivity that provides useful information to support diagnosis of conditions like dysphagia, achalasia, and hiatal hernia. By precisely quantifying the contractions of the esophagus and its sphincters, this procedure helps provide a more complete esophageal pressure profile of the patient.

Esophageal pressure measurement, or manometry, as well as electrical impedance, can be used to assess motility function of the esophagus and bolus transit dynamics in the esophagus. The manometric catheter probe 300 includes sensor assembly 320 (FIG. 4) (e.g., pressure sensors) located along its length. The manometric catheter probe 300 can be inserted into the esophagus, typically reaching the lower esophageal sphincter (LES) and extending into the stomach of a patient, with the pressure sensors positioned at the LES and at a plurality of other specific points along the length of the esophagus at predetermined distances above the LES. The LES is a muscle that separates the esophagus from the stomach. It acts as a valve that normally stays tightly closed to prevent contents in the stomach from backing up into the esophagus During a procedure, the patient swallows a specific amount of water with the manometric catheter probe 300 placed in the esophagus. The esophageal pressure at the sensor assemblies 320 (FIG. 4) can be measured and used as an indication of the magnitude and sequence of the peristaltic contractions. In addition, because the positions of the sensor assemblies 320 are known, the velocity of the peristaltic motion can also be ascertained from the location of the peak pressure, or onset of pressure rise, at each location as a function of time. The test can be repeated a number of times to obtain a set of pressure and velocity values, a statistical analysis of which may be used for diagnostic purposes.

High-resolution manometry involves the collection of data with a catheter having closely spaced sensors. Such high-resolution data enables spatiotemporal contour plots visualization of contractile pressure physiology. Products such as ManoScan™ data acquisition software and ManoView™ data analysis software may be used to aid in visualizing high-resolution manometry data.

The manometric catheter probe 300 may include other sensors 316 (FIG. 4) such as impedance sensors. High-resolution impedance measurements provide for spatiotemporal plotting of bolus movement. Electrical impedance at a plurality of points in the esophagus can be used to detect and monitor the movement of a bolus through the esophagus. A bolus of water or food will have different electrical impedance than the non-filled esophagus, so a change in impedance in the esophagus indicates the presence of a bolus. Therefore, the manometric catheter probe 300 positioned in the esophagus with a plurality of impedance and/or acidity sensors dispersed along its length can be used to detect and monitor the bolus transit, i.e., the movement of a bolus through the esophagus.

Figure 2:
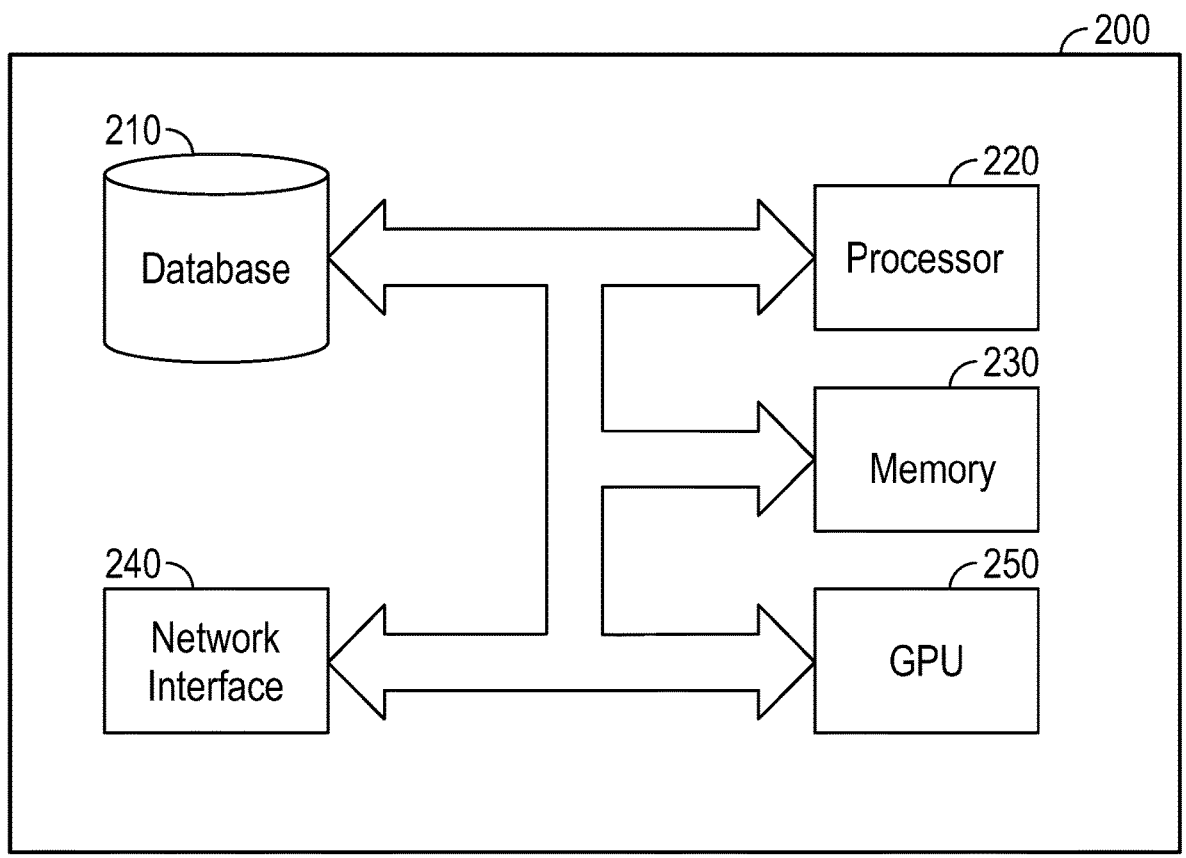
FIG. 2 is a block diagram of a controller provided in accordance with the disclosure and configured for use with the manometry system of FIG. 1.

FIG. 2 illustrates the controller 200, in accordance with the disclosure, which includes a processor 220 that is connected to a computer-readable storage medium or a memory 230. The computer-readable storage medium or memory 230 may be a volatile type memory, e.g., RAM, or a non-volatile type memory, e.g., flash media, disk media, etc. In various aspects of the disclosure, the processor 220 may be any type of processor such as, without limitation, a digital signal processor, a microprocessor, an ASIC, a field-programmable gate array (FPGA), or a central processing unit (CPU).

In aspects of the disclosure, the memory 230 can be random access memory, read-only memory, magnetic disk memory, solid-state memory, optical disc memory, and/or another type of memory. In some aspects of the disclosure, the memory 230 can be separate from the controller 200 and can communicate with the processor 220 through communication buses of a circuit board and/or through communication cables such as serial ATA cables or other types of cables. The memory 230 includes computer-readable instructions that are executable by the processor 220 to operate the controller 200. The memory 230 may include volatile (e.g., RAM) and non-volatile storage configured to store data, including software instructions for operating the manometry system 100. In other aspects of the disclosure, the controller 200 may include a network interface 240 to communicate with other computers or to a server. A storage device 210 may be used for storing data.

Figure 3:
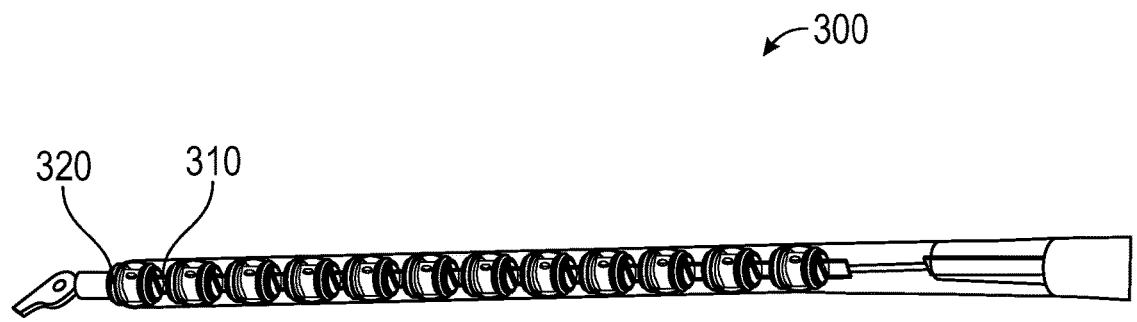
FIG. 3 is an illustration of a manometric catheter probe of the manometry system shown in FIG. 1.

FIG. 3 illustrates a manometric catheter probe 300. The manometric catheter probe 300 generally includes a second sleeve 310 disposed over sensor assembly(s) 320. It is contemplated that the manometric catheter probe 300 May contain any number (including 0) of additional sleeves past the first sleeve. The manometric catheter probe 300 may have any number of connectors for communicating signals (e.g., sensed pressure signals) to the controller 200 (FIG. 1). Analog signals from the manometric catheter probe 300 may be converted to digital signals for further processing by the controller 200 (FIG. 1). In aspects, the manometric catheter probe 300 may communicate the signals wirelessly to controller 200 (FIG. 1). The second sleeve 310 may be a flexible tubular membrane. The second sleeve 310 may be configured to protect the sensor assembly(s) 320 and/or other portions of the manometric catheter probe 300 from body fluids of a patient during a procedure. In aspects, the manometric catheter probe 300 may include multiple sensor assemblies 320 evenly spaced along the length of the manometric catheter probe 300. The manometric catheter probe 300 may have any suitable number of sensor assemblies 320. For example, the manometric catheter probe 300 may have sixteen sensor assemblies 320, such that during a procedure, pressure, impedance, etc. can be measured along the length of the esophagus.

Figure 4:
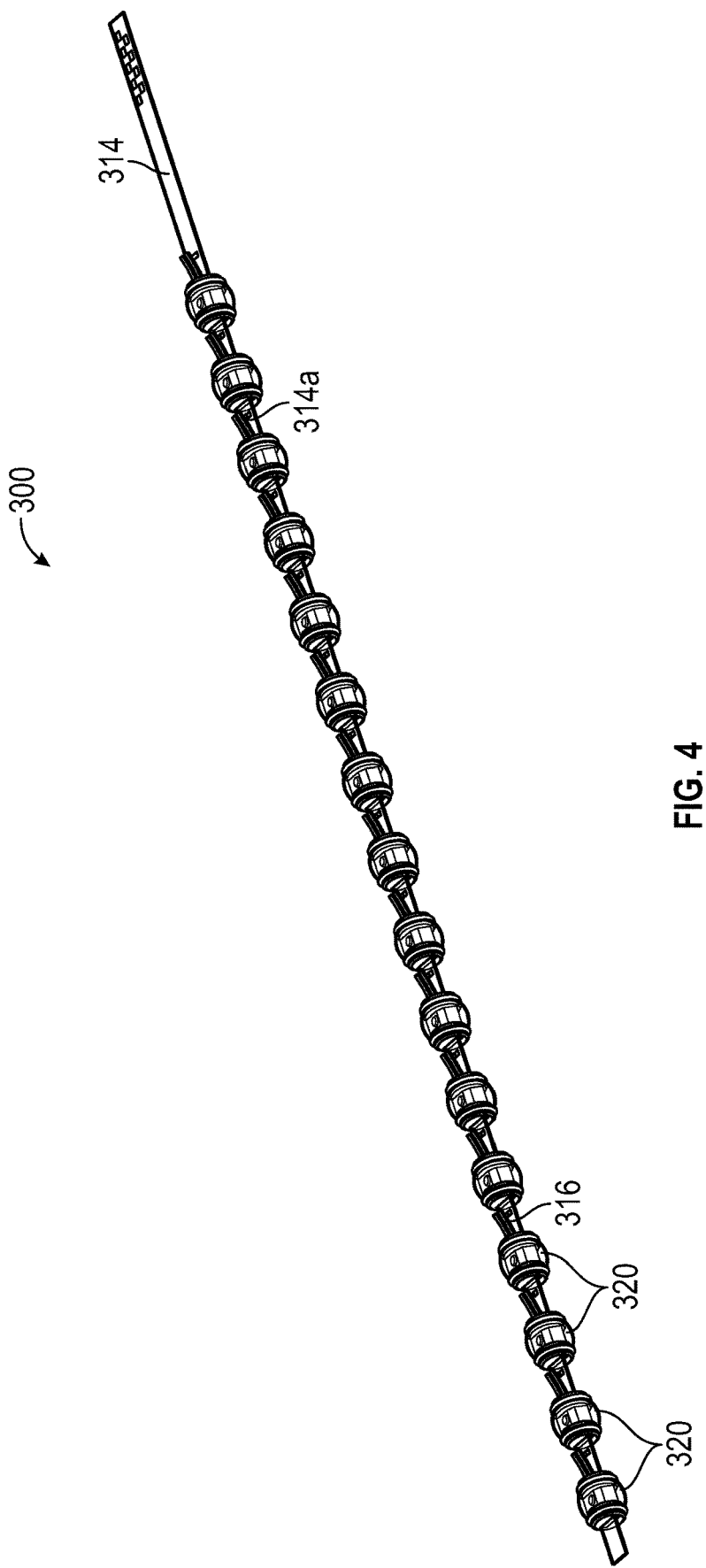
FIG. 4 is a perspective view of the manometric catheter probe of FIG. 3.

FIG. 4 illustrates a view of the manometric catheter probe 300 of FIG. 3 without a second sleeve 310. The manometric catheter probe 300 may further include a flexible printed circuit 314. The flexible printed circuit 314 includes electrical conductors 314a and is configured for electrical communication with at least one pressure sensor assembly 320 and/or other sensors 316 (e.g., a temperature sensor, and/or an impedance sensor) coupled with the flexible printed circuit along the length of the flexible printed circuit 314. Flexible printed circuits (also variously referred to as flex circuits, flexible printed circuit boards, flex print, and/or flexi-circuits) are members of electronic and interconnection family. Flexible printed circuits typically include a thin insulating polymer film having conductive circuit patterns affixed thereto and typically supplied with a thin polymer coating to protect the conductor circuits. The sensors 320, 316 slide onto the flex printed circuit 314 and are wired to the respective pads and fixed in place. In aspects, custom-molded silicone parts may slide in between the sensors 320, 316. In aspects, the manometric catheter probe 300 may include multiple sensor assemblies 320 evenly spaced along the length of the manometric catheter probe 300. For example, the manometric catheter probe 300 may have 36 sensor assemblies 320, such that during a procedure, pressure, impedance, etc. can be measured along the length of the esophagus.

Figure 5:
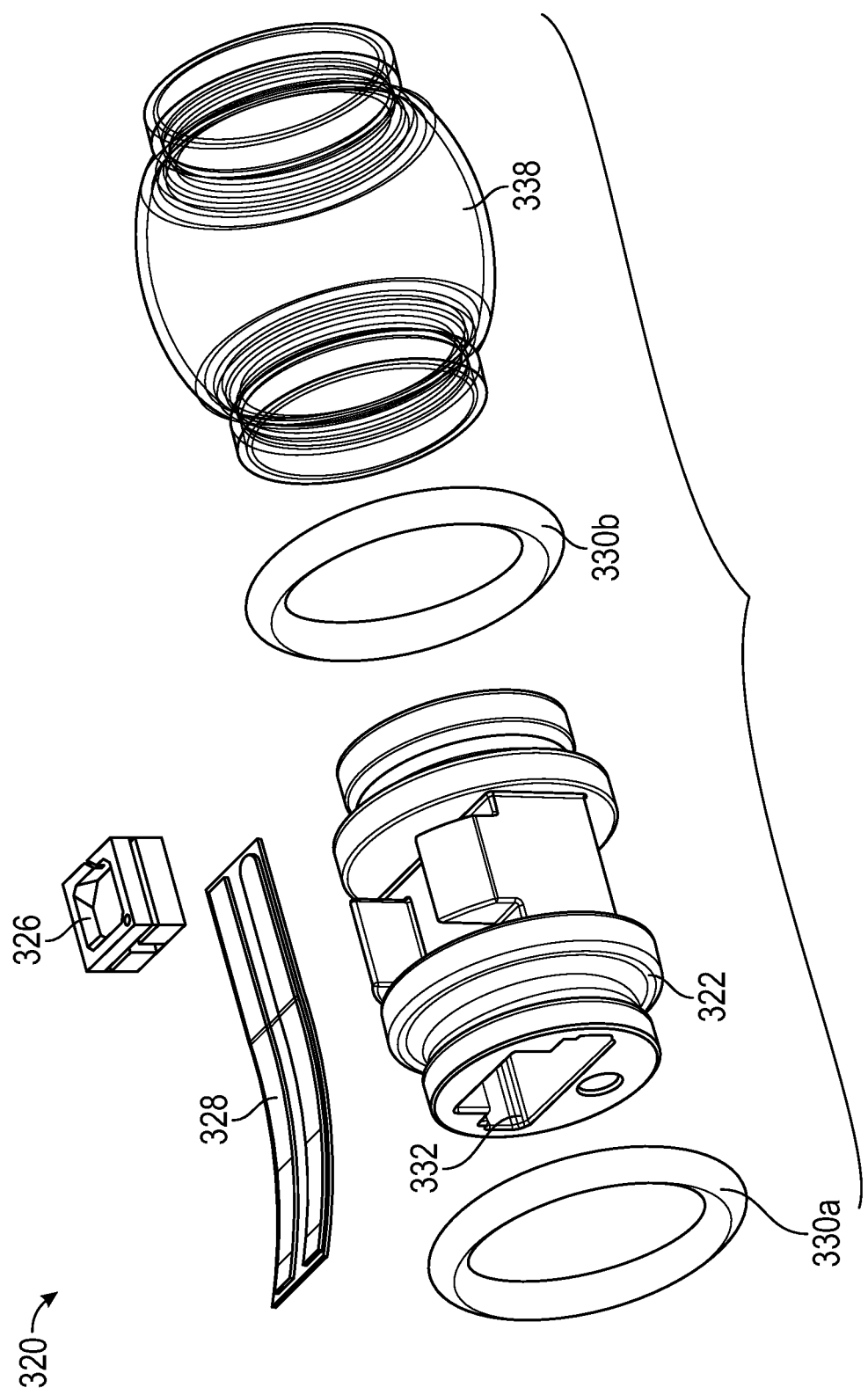
FIG. 5 is an exploded perspective view of a probe assembly provided in accordance with the disclosure and configured for use with the manometry system of FIG. 1.

FIG. 5 illustrates an exploded view of the sensor assembly 320. The sensor assembly 320 generally includes a body 322, a microelectromechanical systems (MEMS) sensor 326, an electrical connector 328 (e.g., contacts, connections, and/or connectors), and a flexible sleeve 338. The sensor assembly 320 may include a first cylindrical seal 330a and a second cylindrical seal 330b, configured for sealing the flexible sleeve 338. The cylindrical seals may be mechanical (e.g., rings), physical (e.g., melted/welded), or chemical (e.g., adhesive) in nature. The body 322 may be any suitable shape, for example, a cylindrical shape. However, other shapes are contemplated.

Figure 6:
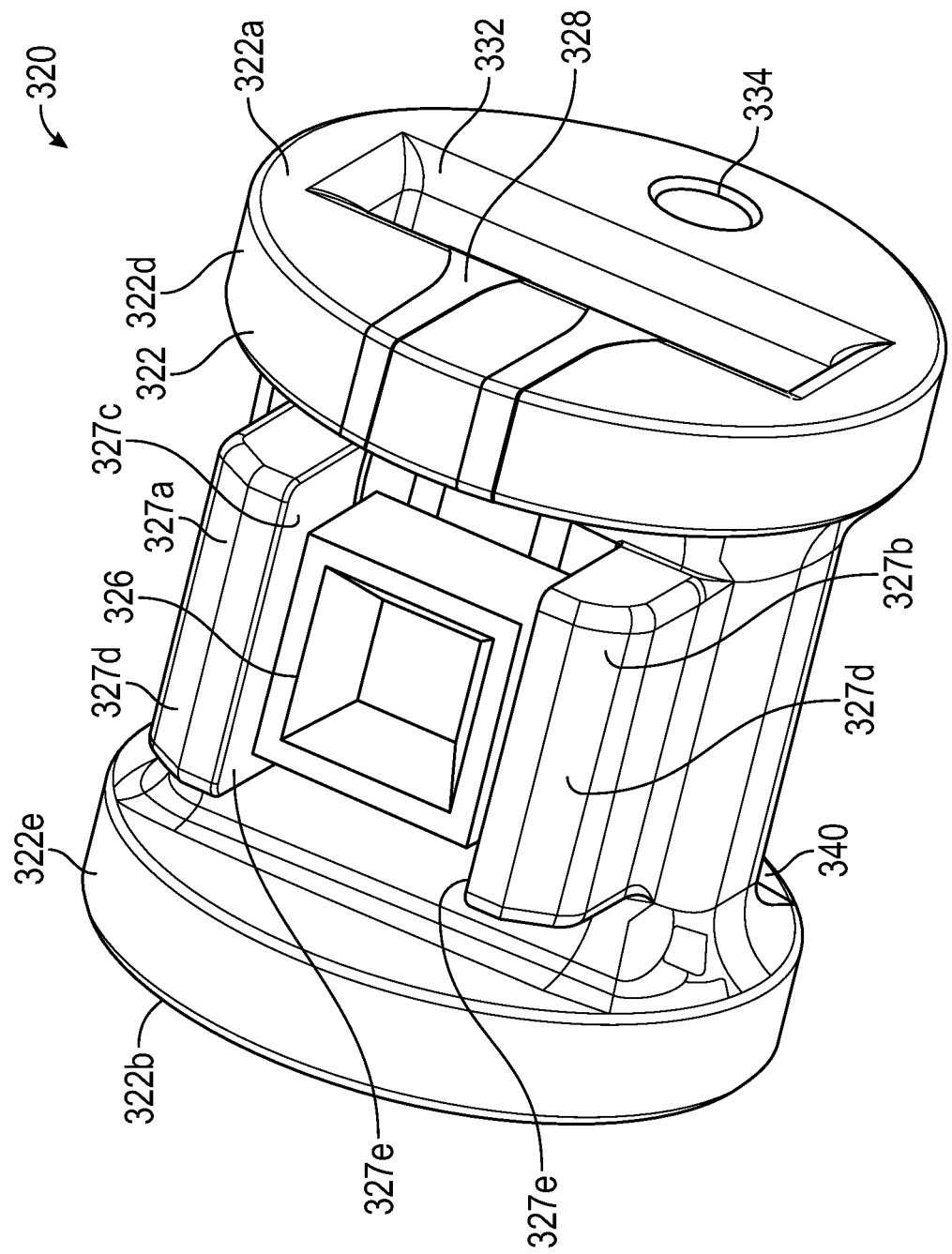
FIG. 6 is perspective view of the probe assembly of FIG. 5.

FIG. 6. illustrates a perspective view of the sensor assembly 320 of FIG. 5. The body 322 includes a central cavity 332 (e.g., a flex travel slot) configured to allow passage of the flexible printed circuit 314 (FIG. 4). The central cavity may permit air movement and/or fluid movement (separated from the intermediary pressure fluid). For example, air movement and/or fluid movement may be used for anorectal probe designs that may require integrated balloon inflation. In aspects, the air and/or fluid remains separate from the fluid used in a pressure balloon 350 of the sensor assembly 320. Integrated wire bundles and/or flex circuits may be used for pressure signals and/or other signals such as impedance measurements, temperature measurements, and/or digital signals. An annular recess 340 is formed around a circumference of the body 322. The annular recess 340 may be formed about a midportion 322b of the perimeter of the body 322. The annular recess 340 may be around portions of or the entirety of the circumference of the body 322. The body may further include a first support wall 327a and a second support wall 327b defining a cavity for supporting the MEMS sensor 326. The first support 327a and the second support 327b extend longitudinally in a mirrored relationship with each other. The first support 327a and the second support 327b include a flat inner surface 327e to help secure the MEMS sensor 326 in the cavity 327c and an outer surface 327d. The outer surface 327d may be of any suitable shape or configuration, including flat, beveled, and/or chamfered.

The MEMS sensor 326 is disposed within the annular recess 340 of the body 322 on an outer surface of the body 322. The MEMS sensor 326 is configured to sense pressure and generate a signal, including the sensed pressure information. MEMS devices combine small mechanical and electronic components on a silicon chip. Generally, MEMS are made up of components from about 1 and to about 100 micrometers in size (i.e., 0.001 to 0.1 mm), and MEMS devices generally range in size from about 20 micrometers to about a millimeter (i.e., 0.02 to 1.0 mm). They typically include a central unit that processes data (an integrated circuit chip such as a microprocessor) and several components that interact with the surroundings (such as microsensors). MEMS technology is distinguished from molecular nanotechnology or molecular electronics in that the latter must also consider surface chemistry.

Several types of pressure sensors can be built using MEMS techniques, including piezoresistive (e.g., ohmic) and capacitive. In both of these, a flexible layer is created, which acts as a diaphragm that deflects under pressure, but different methods are used to measure the displacement. In a capacitive sensor, conducting layers are deposited on the diaphragm and the bottom of a cavity to create a capacitor. Deformation of the diaphragm changes the spacing between the conductors and hence changes the capacitance. For example, the change can be measured by including the sensor in a tuned circuit, which changes its frequency with changing pressure. Alternatively, the capacitance can be measured more directly by measuring the time taken to charge the capacitor from a current source. For example, this can be compared with a reference capacitor to account for manufacturing tolerance and to reduce thermal effects.

The electrical connector 328 is configured to electrically couple the MEMS sensor 326 and the flexible printed circuit 314. The electrical connector 328 may be any suitable electrical connector, including, for example, a non-limiting list of a flex circuit, a printed circuit board, wires, and/or gold traces. The pressure sensed by the MEMS sensor 326 is electrically communicated to the electrical connector 328. The electrical connector 328 may be electrically attached to the flexible printed circuit 314 and configured to communicate the electrical signals generated by the MEMS sensor 326. In various aspects, the MEMS sensor 326 may be disposed on the electrical connector 328 prior to installing the MEMS sensor 326 into the body 322 of the sensor assembly 320. In various aspects, the each of the electrical connectors 328 of each of the sensor assemblies 320 may be connected to its own set of electrical connections to the flexible printed circuit 314, and/or they may be connected in a matrix, for example, the output of two or more sensor assemblies 320 may be electrically grouped together.

Figure 7:
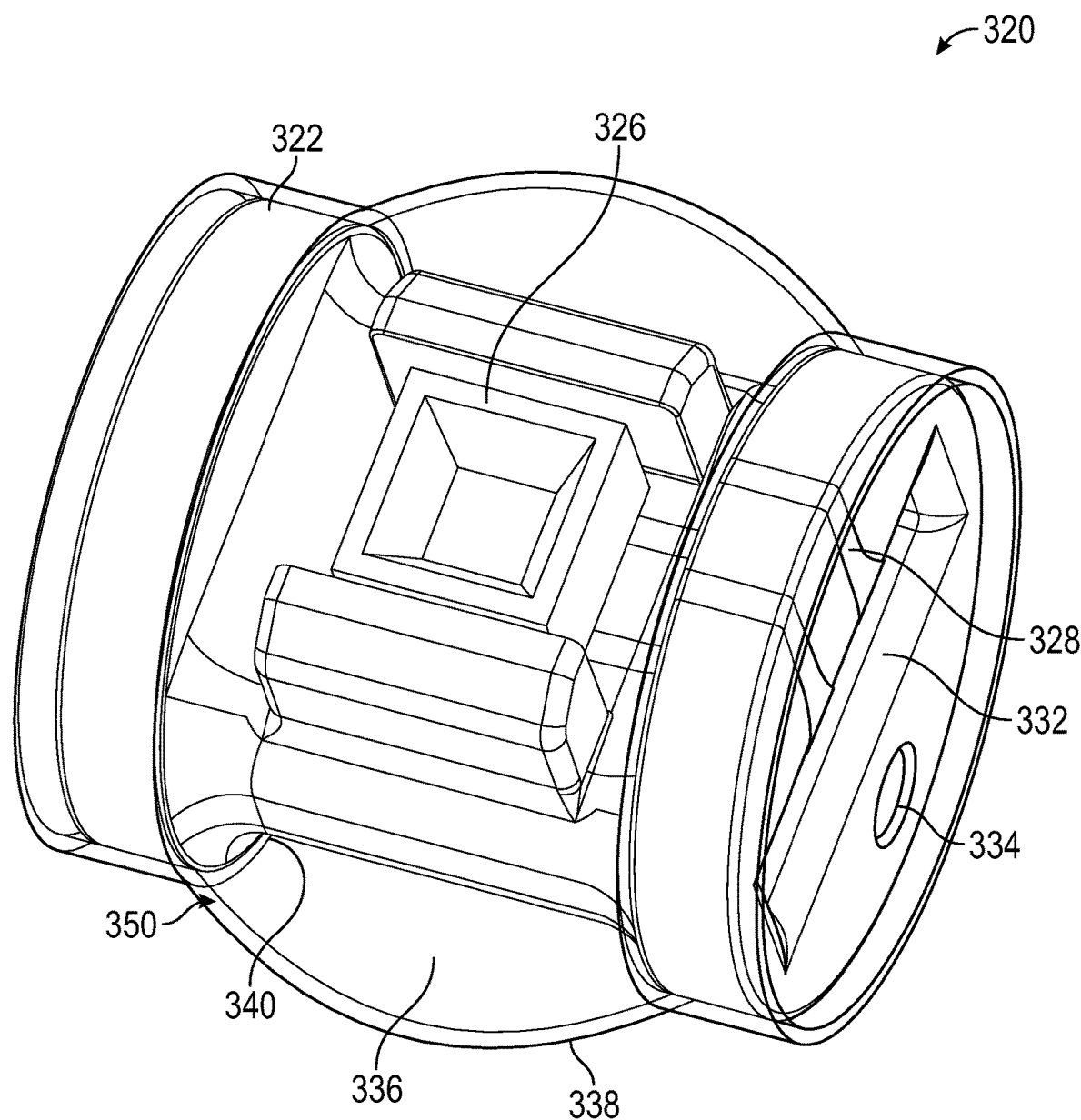
FIG. 7 is a perspective view of the probe assembly of FIG. 5 having a flexible sleeve disposed over the MEMS sensor.

FIG. 7 illustrates a perspective view of the sensor assembly 320 of FIG. 5. A pressure balloon 350 is formed by disposing the flexible sleeve 338 over the MEMS sensor 326, sealing the flexible sleeve 338, and filling it with a fluid 336. The flexible sleeve 338 is disposed over the annular recess 340 of the body 322. The flexible sleeve 338 may include any flexible material including, for example, thermoplastic elastomer and/or silicone. In various aspects, the thickness of the flexible sleeve 338 should be thick enough to retain the fluid but thin enough to transfer the pressure changes. For example, the flexible sleeve 338 may include a thickness of between approximately 0.005 inches to about 0.020 inches.

The flexible sleeve 338 includes a fluid 336 (e.g., oil) configured to communicate pressure to the MEMS sensor 326, which is disposed in the fluid 336. The fluid 336 may include any stable non-conductive fluid that is not too viscous and is compatible with the flexible sleeve 338 material, for example, vegetable/seed oil (e.g., canola oil), mineral oil, and/or deionized water. The flexible sleeve 338 may be comprised of, for example, silicon. In an aspect, a set of rings 330a and 330b may be disposed on opposing ends of the flexible sleeve 338 and configured to seal the flexible sleeve 338 by, for example, crimping the cylindrical seals 330a and 330b. The cylindrical seals 330a and 330b may be made of, for example, a metal such as brass, and/or plastic.

Figure 8:
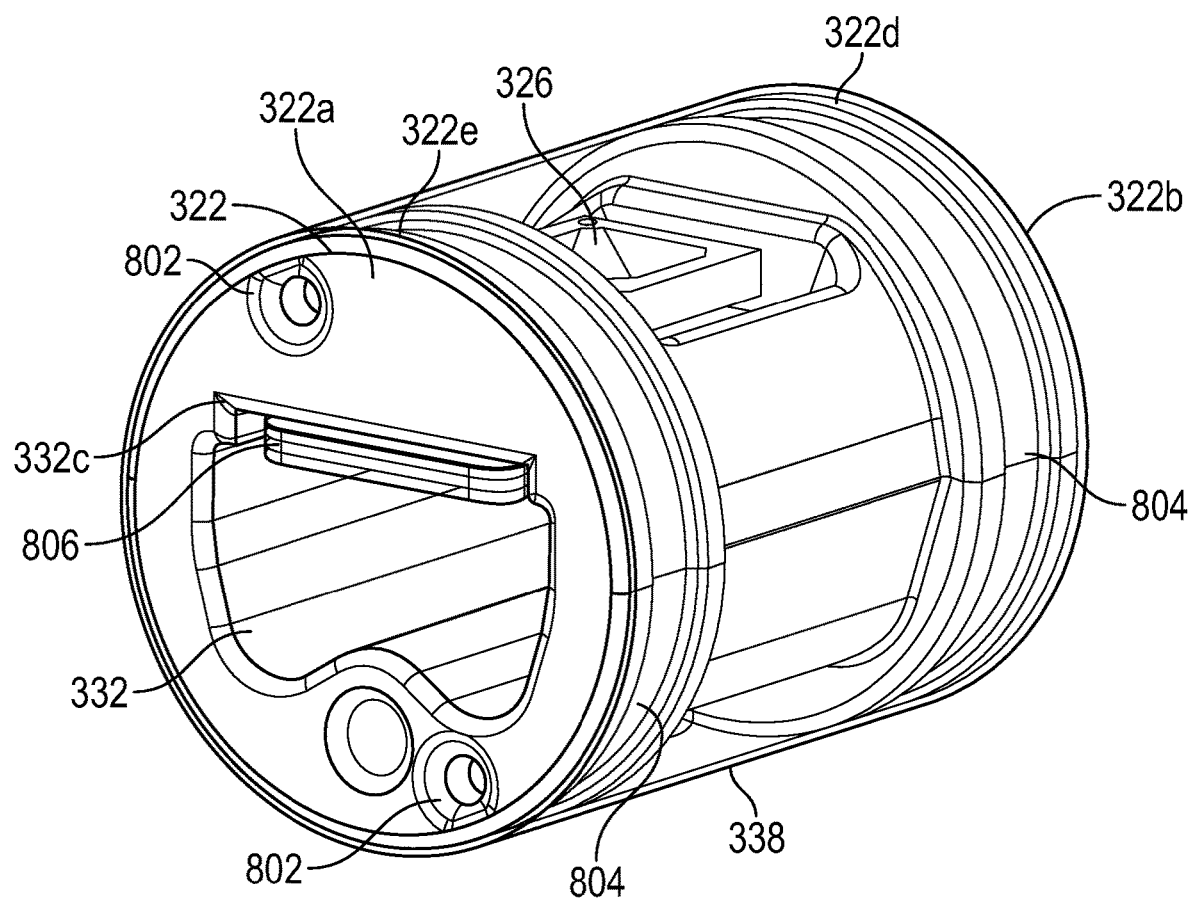
FIG. 8 is a perspective view of the manometric catheter probe of FIG. 3.

FIG. 8 illustrates a perspective view of the sensor assembly 320. It is contemplated that other ways of sealing the flexible sleeve 338 may be used, such as, for example, an adhesive stopper. In an aspect, sealing channels 804 may be formed in a first end 322d and a second end 322e of the body 322 of the sensor assembly 320. The sealing channels 804 may include a port 802 (e.g., an adhesive injection hole) for filling the sealing channels when the flexible sleeve 338 is installed. The adhesive may include any adhesive that is compatible with the material of the flexible sleeve 338, including, for example, cyanoacrylate.

The sensor assembly 320 may further include a fluid injection port configured for filling the fluid in the flexible sleeve 338. The pressure balloon 350 extends the pressure measurement surface area of the MEMS sensor 326 to the entire circumference of the manometric catheter probe 300. The pressure balloon 350 allows the sensing of pressure from any angle around the manometric catheter probe 300. For example, during a procedure, the patient swallows a specific amount of water, or other liquid, with the manometric catheter probe 300 (FIG. 1) placed in the esophagus. The esophageal pressure communicates pressure to the pressure balloon 350 and causes the fluid 336 to induce a pressure on the MEMS sensor 326. This pressure can be measured by the MEMS sensor 326, communicated to the manometry system 100, and used as an indication of the magnitude and sequence of the peristaltic contractions.

The manometry system 100 communicates a small voltage, low current, sine wave to the MEMS sensor 326. As a diaphragm of the MEMS sensor 326 is displaced in reaction to the pressure communicated to the MEMS sensor 326 via the fluid 336, the capacitance of the MEMS sensor 326 changes. The change in capacitance changes the amplitude and/or phase of the sine wave, which is then measured and processed by the manometry system 100 into a pressure measurement.

Figure 9:
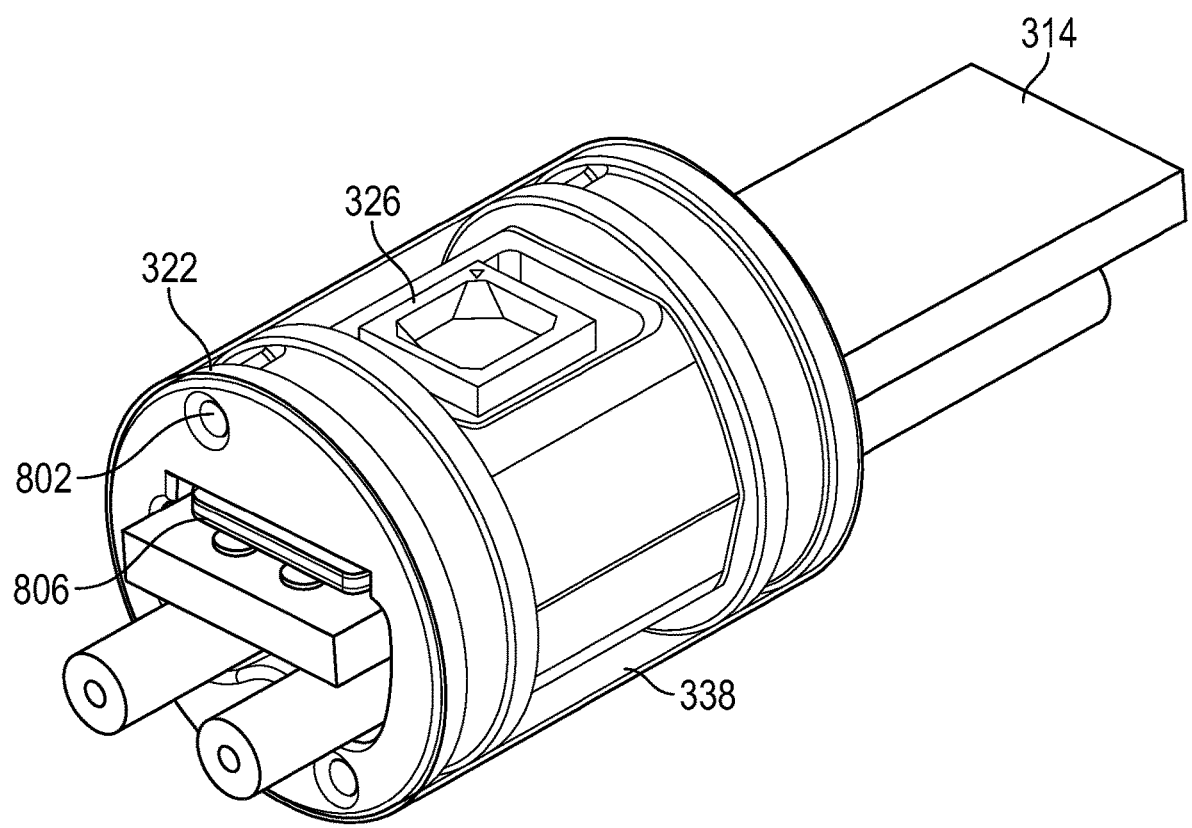
FIG. 9 is a perspective view of the manometric catheter probe of FIG. 3 coupled to a flexible printed circuit.

FIG. 9 illustrates a perspective view of the sensor assembly 320. In aspects, the sensor assembly 320 may include a printed circuit board (PCB) 806 for mounting the MEMs sensor 326 to the body 322 of the sensor assembly 320 is shown. The MEMs sensor 326 may be soldered or conductive epoxied to the PCB 806. The central cavity 332 of the body 322 may include a recess 332c configured for mounting the PCB 806. The PCB 806 may be disposed on the body 322 of the sensor assembly 320 by a sealant, including, but not limited to, for example, silicone and/or epoxy.

Figure 10:
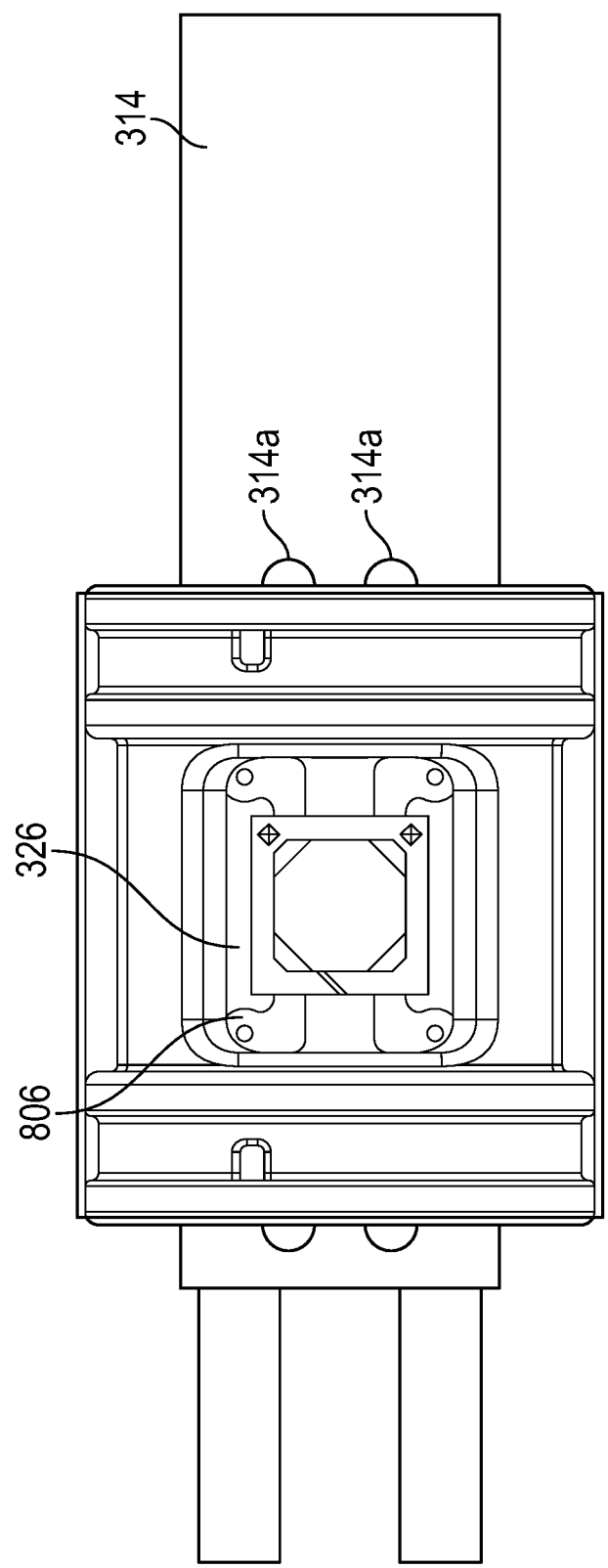
FIG. 10 is a top view of the manometric catheter probe of FIG. 3.

FIG. 10 illustrates a top view of the sensor assembly 320 of FIG. 9. The flexible printed circuit 314 includes electrical conductors 314a and is configured for electrical communication with at least one pressure sensor assembly 320 disposed along the length of the flexible printed circuit 314. For example, pressure signals generated by the MEMS sensor 316 are electrically communicated to conductors on the PCB 806, which, in turn are electrically communicated to the flexible printed circuit 314 via electrical conductors 314a.

Figure 11:
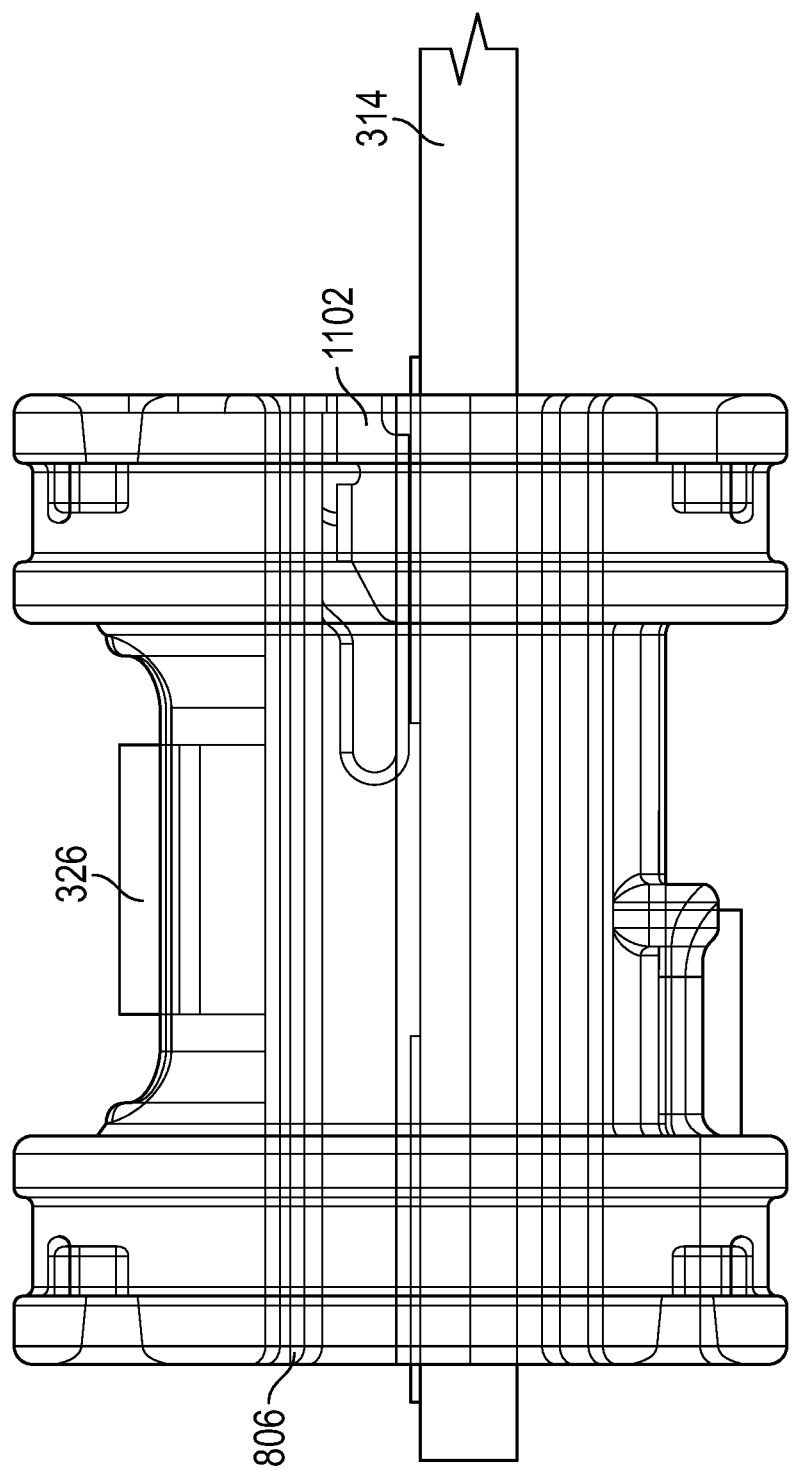
FIG. 11 is a side view of a spring contact of the manometric catheter probe of FIG. 3.

FIG. 11 illustrates a spring contact 1102 of the sensor assembly 320. The spring contact 1102 makes an electrical connection between PCB 806 that the MEMs sensor 326 is disposed on and the flexible printed circuit 314. For example, the MEMs sensor 326 generates a signal and conducts the signal via the sensor PCB 806, and/or the electrical connector 328 to which it is electrically connected. The signal is then conducted via the spring contact 1102 to the flexible printed circuit 314 for further processing by the system. The spring contact 1102 generally includes a single piece of conductive metal folded over in a spring leaf formation. The spring contact 1102 may save assembly time and process, as well as improve efficiencies by reducing the amount of soldering or conductive epoxying that would otherwise be used to assemble the sensor assembly 320. The spring contact 1102 may be made of, for example, a copper alloy, spring steel, nickel, and/or beryllium copper. In various aspects, the spring contact 1102 may include a pogo pin, and/or a spring-loaded pin.

Figure 12:
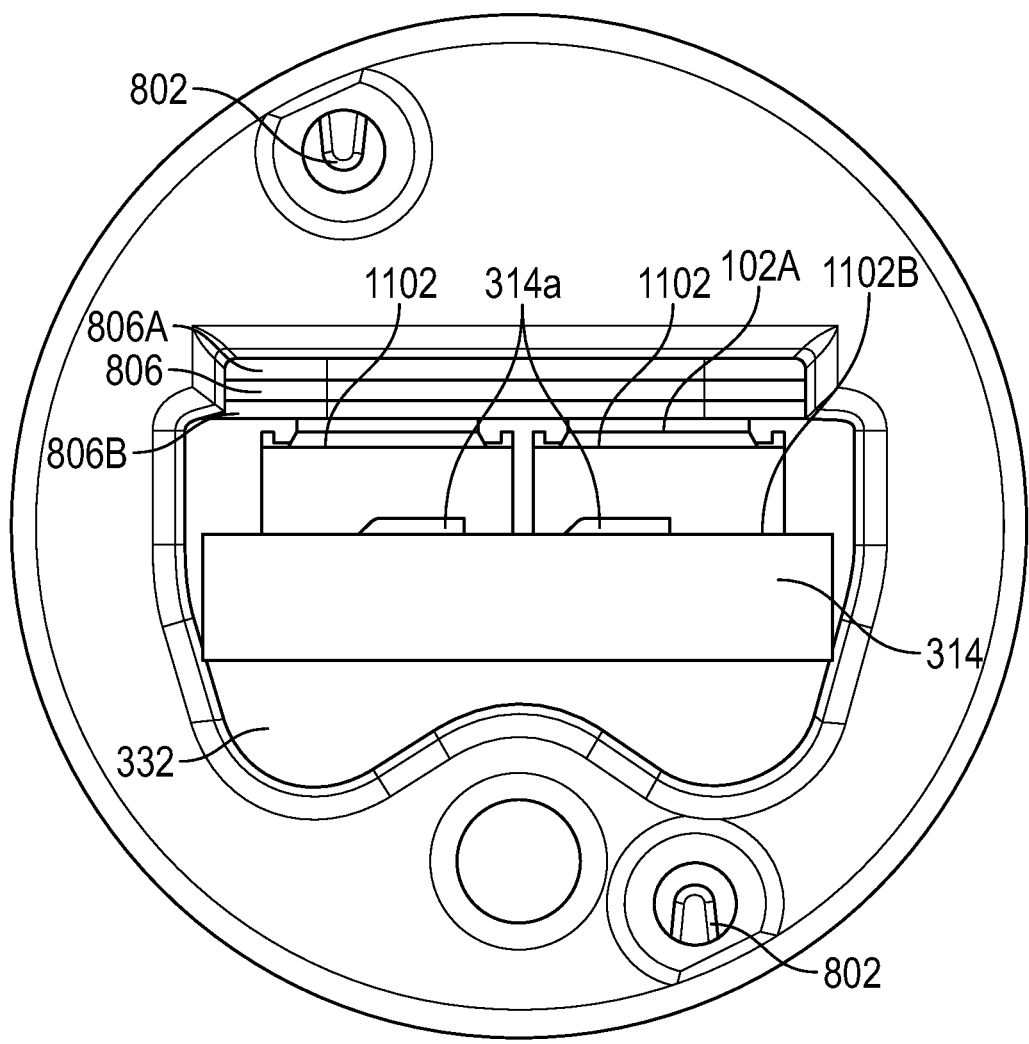
FIG. 12 is an end view of the spring contact of the manometric catheter probe of FIG. 3.
Figure 13:
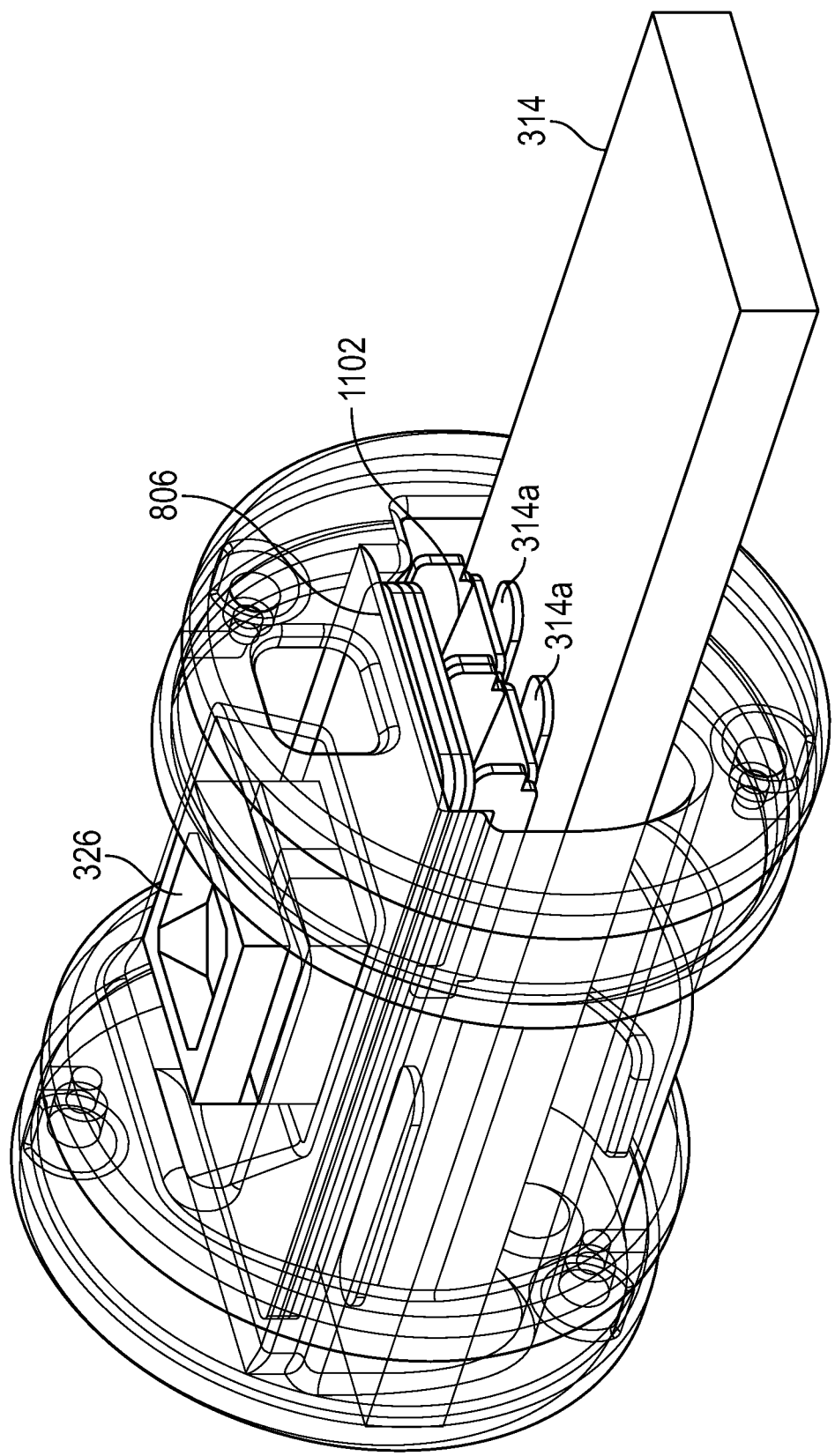
FIG. 13 is a perspective view of the spring contact of the manometric catheter probe of FIG. 3.

FIG. 12 illustrates an end view of the sensor assembly 320. The MEMs sensor 326 (FIG. 13) is disposed on a top surface 806A of the PCB 806. A bottom surface 806B of the PCB 806 is disposed on a top portion 1102A of the spring contact 1102. A bottom portion 1102B of the spring contact 1102 is disposed on the electrical contacts 314A of the flexible printed circuit 314.

From the foregoing and with reference to the various figure drawings, those skilled in the art will appreciate that certain modifications can also be made to the present disclosure without departing from the scope of the same. While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A manometric catheter probe, comprising:
   a flexible printed circuit;
   at least one pressure sensor assembly disposed along the flexible printed circuit and coupled therewith, the at least one pressure sensor assembly including:
      a body including a central cavity receiving at least a portion of the flexible printed circuit;
      an annular recess around the body;
      a microelectromechanical systems (MEMS) sensor disposed in the annular recess;
      an electrical connector configured to electrically couple the MEMS sensor and the flexible printed circuit; and
      a first flexible sleeve disposed over the body in a manner forming a cavity between the first flexible sleeve and the annular recess for containing a fluid, the fluid configured to communicate pressure to the MEMS sensor; and
   a second sleeve disposed over the at least one pressure sensor assembly.

2. The manometric catheter probe of claim 1, wherein the body of the at least one pressure sensor assembly includes a cylindrical shape.

3. The manometric catheter probe of claim 1, wherein the at least one pressure sensor assembly further includes a fluid injection port configured for filling the fluid into the first flexible sleeve.

4. The manometric catheter probe of claim 1, wherein the electrical connector is comprised of at least one of a flexible circuit or a printed circuit board.

5. The manometric catheter probe of claim 1, wherein the annular recess is a ring configuration and is disposed about a midportion of a perimeter of the body.

6. The manometric catheter probe of claim 1, wherein the at least one pressure sensor assembly is configured to sense pressure from any angle around the manometric catheter probe at a respective location of the at least one pressure sensor assembly along a length of the manometric catheter probe.

7. The manometric catheter probe of claim 1, wherein the fluid includes oil.

8. The manometric catheter probe of claim 1, wherein the central cavity is configured for at least one of movement of air or movement of a second fluid.

9. The manometric catheter probe of claim 1, wherein the at least one pressure sensor assembly further comprises:
   a first sealing channel disposed on a first end of the body and configured to seal the fluid in the first flexible sleeve; and
   a second sealing channel disposed on a second end of the body and configured to seal the fluid in the first flexible sleeve.

10. The manometric catheter probe of claim 1, wherein the electrical connector includes a spring contact configured to electrically couple the MEMS sensor and the flexible printed circuit.

11. A manometry system comprising:
   manometric catheter probe comprising:

a flexible printed circuit;
at least one pressure sensor assembly coupled with the flexible printed circuit along a length of the flexible printed circuit, the at least one pressure sensor assembly including:
  a body including an annular recess;
  a central cavity through the body receiving at least a portion of the flexible printed circuit;
  a pressure balloon disposed on an outside of the central cavity, including:
    a fluid configured to communicate pressure to a microelectromechanical systems (MEMS) sensor; and
    a first flexible sleeve disposed over the body in a manner forming a cavity between the first flexible sleeve and the annular recess for containing the fluid;
  a MEMS sensor disposed in the pressure balloon, in communication with the fluid; and
  an electrical connector configured to electrically couple the MEMS sensor and the flexible printed circuit; and
  a second sleeve disposed over the at least one pressure sensor assembly;
a processor; and
a memory, including instructions stored thereon, which, when executed, cause the manometry system to:
  acquire a pressure measurement from the at least one pressure sensor assembly, and
  determine, based on the measurements, at least one of a motility function of an esophagus or a bolus transit dynamics in the esophagus.

12. The system of claim 11, wherein the body of the at least one pressure sensor assembly includes a cylindrical shape.

13. The system of claim 11, wherein the at least one pressure sensor assembly further includes a fluid injection port configured for filling the fluid into the flexible sleeve.

14. The system of claim 11, wherein the electrical connector is comprised of at least one of a flexible circuit or a printed circuit board.

15. The system of claim 11, wherein the pressure balloon is disposed about a midportion of a perimeter of the body.

16. The system of claim 11, wherein the fluid includes oil.

17. The system of claim 11, wherein the central cavity is configured for at least one of movement of air or a movement of a second fluid.

18. The system of claim 11, further comprising at least one of a temperature sensor or an impedance sensor.

19. The system of claim 11, further comprising a wireless communication module.

20. A manometric catheter sensor assembly, comprising:
a body including:
  a central cavity; and
  an annular recess around the body;
a microelectromechanical systems (MEMS) sensor disposed in the annular recess of the body;
an electrical connector configured to electrically couple the MEMS sensor and a flexible printed circuit;
a first flexible sleeve disposed over the body in a manner forming a cavity between the first flexible sleeve and the annular recess of the body for containing a fluid, the first flexible sleeve includes the fluid configured to communicate pressure to the MEMS sensor;
a first sealing channel disposed on a first end of the body and configured to seal the fluid in the first flexible sleeve;
a second sealing channel disposed on a second end of the body and configured to seal the fluid in the first flexible sleeve; and
a second sleeve disposed over the MEMS sensor.

21. A manometric catheter probe kit, comprising:
a flexible printed circuit;
at least one pressure sensor assembly including:
  a body including a central cavity configured to receive at least a portion of the flexible printed circuit;
  an annular recess around the body;
  a microelectromechanical systems (MEMS) sensor configured to be disposed in the annular recess;
  an electrical connector configured to electrically couple the MEMS sensor and the flexible printed circuit; and
  a first flexible sleeve configured to be disposed over the body in a manner forming a cavity between the first flexible sleeve and the annular recess for containing a fluid, the first flexible sleeve including the fluid configured to communicate pressure to the MEMS sensor; and
  a second sleeve configured to be disposed over the at least one pressure sensor assembly.

* * * * *